Aug. 9, 1949.  F. W. BAUKUS  2,478,175
OFFICE IMPLEMENT
Filed June 29, 1945  2 Sheets-Sheet 1
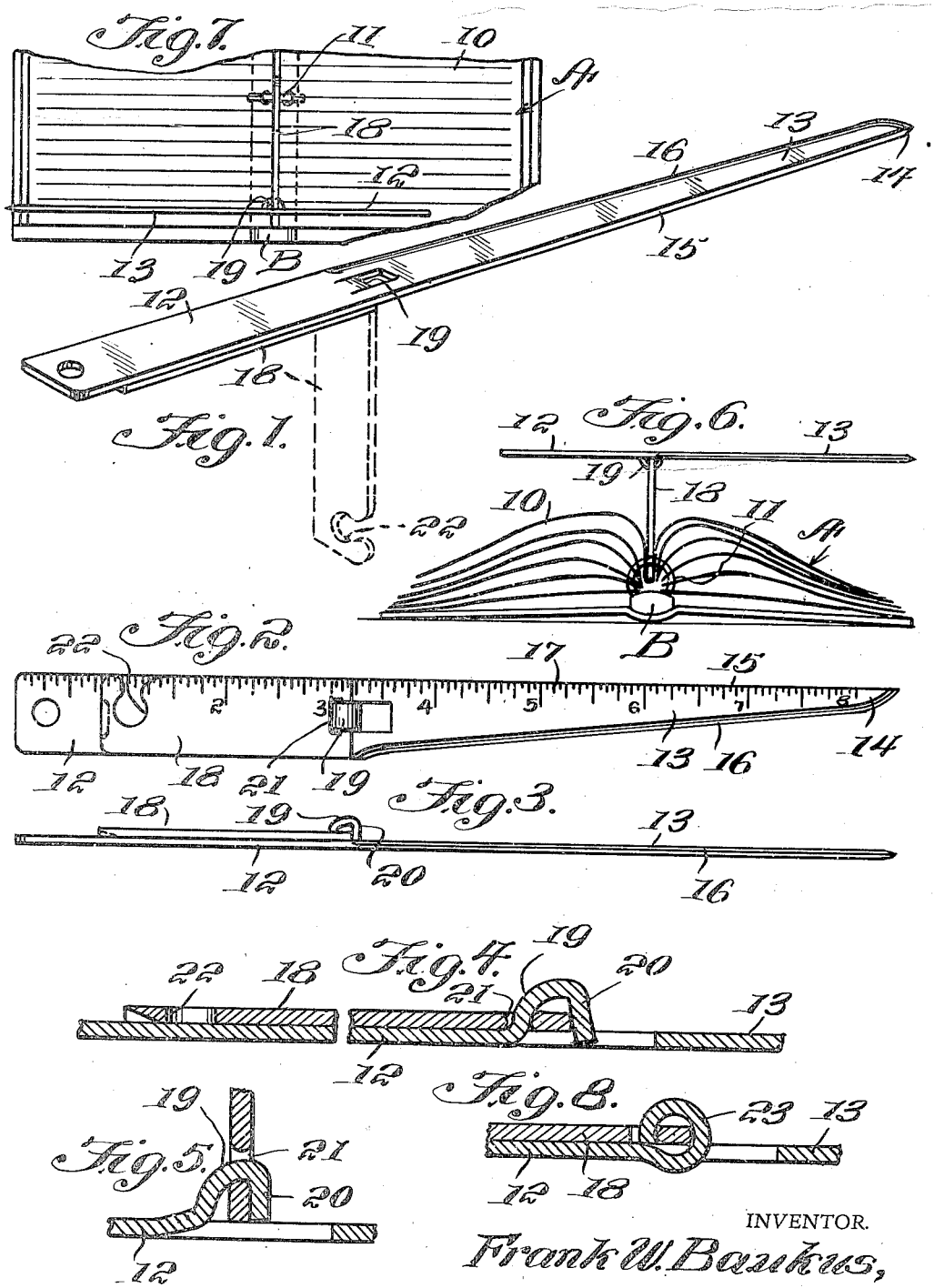
INVENTOR.
Frank W. Baukus,
BY Victor J. Evans & Co.
ATTORNEYS Aug. 9, 1949.　　　　F. W. BAUKUS　　　　2,478,175
OFFICE IMPLEMENT
Filed June 29, 1945　　　　　　　　　　2 Sheets-Sheet 2
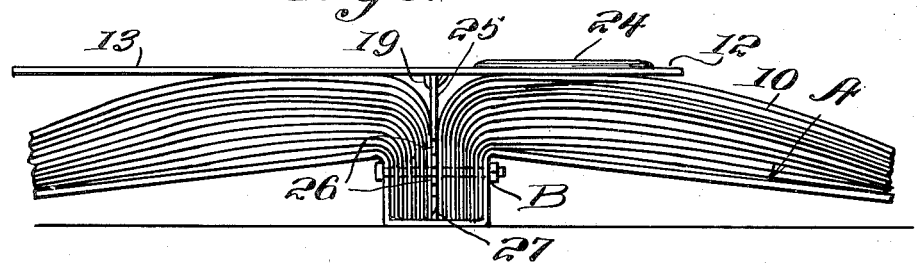
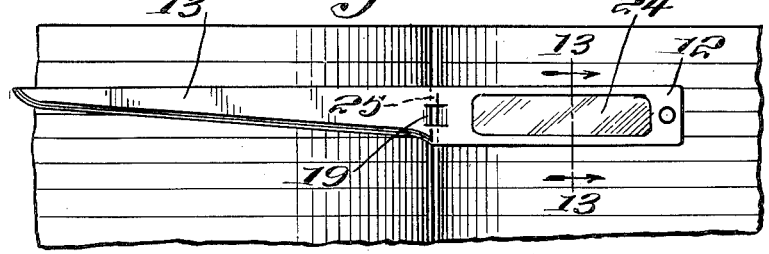
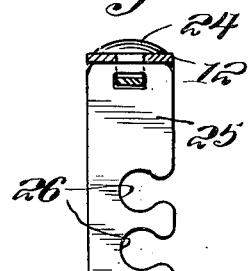
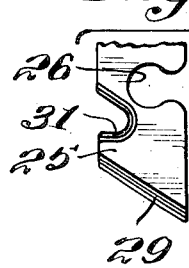
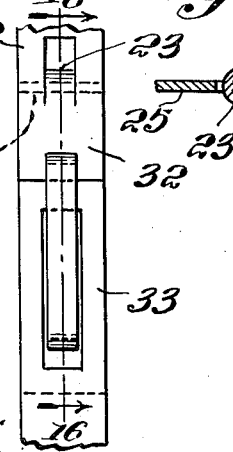
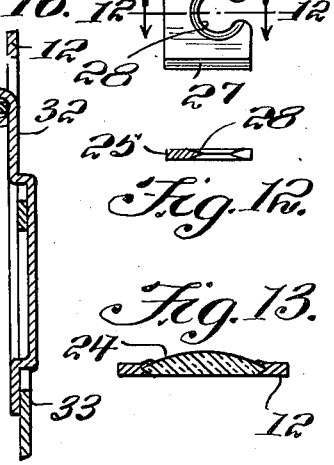
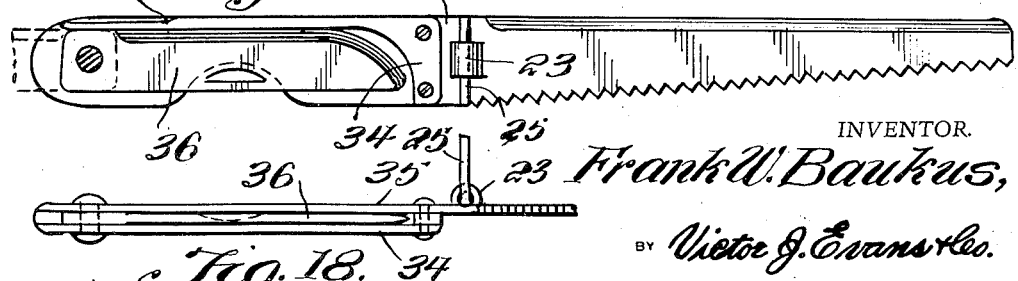
INVENTOR.
Frank W. Baukus,
BY Victor J. Evans & Co.
ATTORNEYS Patented Aug. 9, 1949

2,478,175

UNITED STATES PATENT OFFICE 2,478,175

OFFICE IMPLEMENT

Frank W. Baukus, Saginaw, Mich.

Application June 29, 1945, Serial No. 602,300

2 Claims. (Cl. 281—42)

The invention relates to a home or office gadget, and more especially an office device or implement for many uses, for example, a binder holder, letter opener, paper weight, magnifying glass, line follower, rule, paper cutter, sheet holder, etc.

The primary object of the invention is the provision of a device or implement of this character, wherein on associating it with a temporary bookbinder, the latter will be prevented from closing, and the pages selected for reading, or otherwise, will be held open, and the line of typed or written matter appearing can be accurately followed, and such matter can be magnified by a magnifying glass forming a part of the device or implement, the said device or implement being convertible to a letter opener, paper weight, rule, paper cutter or other handy medium for office services, through selectivity and adjustment therefor.

Another object of the invention is the provision of a device or implement of this character, wherein the construction thereof is novel and unique in the arrangement, so that it will be handy for use, and is entirely devoid of complicated parts, thus enabling the handling with dispatch.

A further object of the invention is the provision of a device or implement of this character, which is simple in construction, thoroughly reliable and efficient for universal services, strong, durable, neat in appearance, readily and easily adjusted, conveniently handled, satisfying a wide range of requirements thereof, and inexpensive to manufacture.

With these and other objects in view, the invention consists in the features of construction, combination and arrangement of parts as will be hereinafter set forth in detail, illustrated in the accompanying drawings, which disclose the preferred and modified forms of construction thereof, and pointed out in the claims hereunto appended.

In the accompanying drawings:

Figure 1 is a perspective view of the device or implement constructed in accordance with the invention, showing by full lines one position under adjustment, and by dotted lines an adjusted position.

Figure 2 is a plan view of the device or implement.

Figure 3 is an edge elevation thereof.

Figure 4 is a fragmentary vertical longitudinal sectional view through the same.

Figure 5 is a view similar to Figure 4 showing the device adjusted and its attaching leg locked open.

Figure 6 is an edge view of a temporary binder opened and the device in applied position thereto.

Figure 7 is a fragmentary top plan view of the structure shown in Figure 6.

Figure 8 is a view similar to Figures 4 and 5 showing a slight modification thereover.

Figure 9 is a view similar to Figure 6 showing another modification thereover.

Figure 10 is a view similar to Figure 7 of the modification shown in Figure 9.

Figure 11 is an elevation partly in section taken transversely of the modification shown in Figure 10.

Figure 12 is a sectional view taken on the line 12—12 of Figure 11 looking in the direction of the arrows.

Figure 13 is a sectional view taken on the line 13—13 of Figure 10 looking in the direction of the arrows.

Figure 14 is a fragmentary exploded side view of variable end formations to the leg of the device or implement.

Figure 15 is a view similar to Figure 11 showing a further modification thereover.

Figure 16 is a sectional view taken on the line 16—16 of Figure 15 looking in the direction of the arrows.

Figure 17 is a view similar to Figure 2 showing a further modification.

Figure 18 is a fragmentary edge elevation of the showing in Figure 17.

Similar reference characters indicate corresponding parts throughout the several views in the drawings.

Referring to the drawings in detail, particularly Figures 1 to 7, inclusive, A designates generally a portion of a loose-leaf book, with its binder B, and removable pages or sheets 10, these being detachably held in place with the binder, as usual, by fastening rings 11, in this instance.

Applicable to this type of book A is the device or implement constituting the present invention, comprising a flat elongated body member 12, which may be made from any suitable material, such as plastic material, hard rubber, metal, wood, or a composition of materials, having a required length, width and thickness, one end portion 13 of such member is outwardly tapered, terminating in a rounded pointed tip 14, while one side edge of this portion 13, which is angled to the opposite straight edge 15 throughout the entire length of the said member, is beveled to provide edge 16, merging into the tip 14, so that this portion 13 can be utilized as a letter-opener, paper cutter, or otherwise.

Disposed along the straight edge 15 at the exposurable face of the member 12 is a graduated scale 17 for measuring purposes, when the member is used as a rule at the said straight edge thereof.

Swingingly connected to the member 12 intermediate of its ends to be disposed at one flat side of such member is a leg 18, and this connection is had by cutting and stamping from the member a hook-like tongue 19 which has its bill 20 confront the plane of the face next thereto of the said member to extend at substantially right angles to this face, and this tongue is trained through an eye 21 provided in the leg 18, the inherent resiliency of the bill and the related tongue enables this leg to be locked in an adjusted position, at substantially right angles to the member 12 under snap action, as best seen in Figures 4 and 5 of the drawings. The eye 21 is close to one end of the leg, while near the other or outer end of the latter is a keyhole shaped slot 22 opening through the side edge of such leg so that it can be hooked to one or another of the rings 11 to assume a position, best seen in Figures 6 and 7 of the drawings, for the holding of the book binder B with the pages or sheets 10 in this condition, to avoid the accidental folding of the book closed.

In Figure 8 of the drawings, the hinge connection of the leg with the body member includes a round eye-like tongue 23 formed from the member for loose hinge connection of such leg and member.

In Figures 9 to 13 of the drawings, there is shown a modification of the invention, wherein the body member carries a magnifying glass 24, while the leg 25 hinged to this member is provided with spaced slots 26, so that it can be adjusted for fitting different thicknesses of loose-leaf books, and an example thereof being best seen in Figures 9 and 10. The outer free end of the leg 25 is knife-edged at 27, then inwardly thereto is a string cutter notch 28, these being best seen in Figure 11. The edge 27 can be used for any purpose desired.

In Figure 14 there are disclosed angled knife-edge tips 29 and 30, respectively, and a form of string cutter notch 31, differing from that shown in Figure 11 of the drawings, thus these are contemplated modifications of the present invention.

In Figures 15 and 16 of the drawings, there is shown a sectional extensible leg 32 the sections being slidably looped together as at 33, and frictionally interfitted with each other, as shown therein.

In Figures 17 and 18 of the drawings, the modification involved therein includes a knife blade housing 34 built on the member 35 and foldably confined within the housing is a pivoted knife blade 36, which may be used for any purpose, the blade being held folded by spring 37 and can be opened and closed correspondingly to the ordinary pen-knife, or pocket knife.

The device or implement, in its preferred and modified forms of construction, can be used for many purposes, which should be obvious, and in repeating some of its uses, a book binder and page holder, letter opener, paper weight, magnifying glass, line follower, rule, paper cutter, knife, nail file, screw driver, saw, etc., which should be the most popular uses.

What is claimed is:

1. An implement adapted to hold in opened position a book having page retaining elements accessible when the book is opened, said implement comprising a flat elongated body portion adapted to overlie the pages when in open condition, a flat depending portion connected to said body portion, said depending portion having a groove adjacent one end thereof and extending transversely of said body portion and open to one side of said depending portion to define a hooked portion at said end, which is adapted to engage one of said page retaining elements to hold said body portion in position on said pages.

2. The invention as in claim 1 wherein said depending portion is swingably mounted on a transverse hinge formed on said body portion so that said depending portion may be swung in longitudinal relation to said body portion.

FRANK W. BAUKUS.

REFERENCES CITED

The following references are of record in the file of this patent:

UNITED STATES PATENTS

| Number | Name | Date |
|--------|------|------|
| 314,507 | Yonge | Mar. 24, 1885 |
| 330,557 | Brown | Nov. 17, 1885 |
| 445,196 | Perry | Jan. 27, 1891 |
| 776,938 | Rebhan | Dec. 6, 1904 |
| 822,553 | Reizenstein | June 5, 1906 |
| 1,015,026 | Jackson et al. | Jan. 16, 1912 |
| 1,193,421 | Prettyman | Aug. 1, 1916 |
| 1,840,135 | Schutt | Jan. 5, 1932 |
| 1,921,911 | Darque | Aug. 8, 1933 |